UNITED STATES PATENT OFFICE.

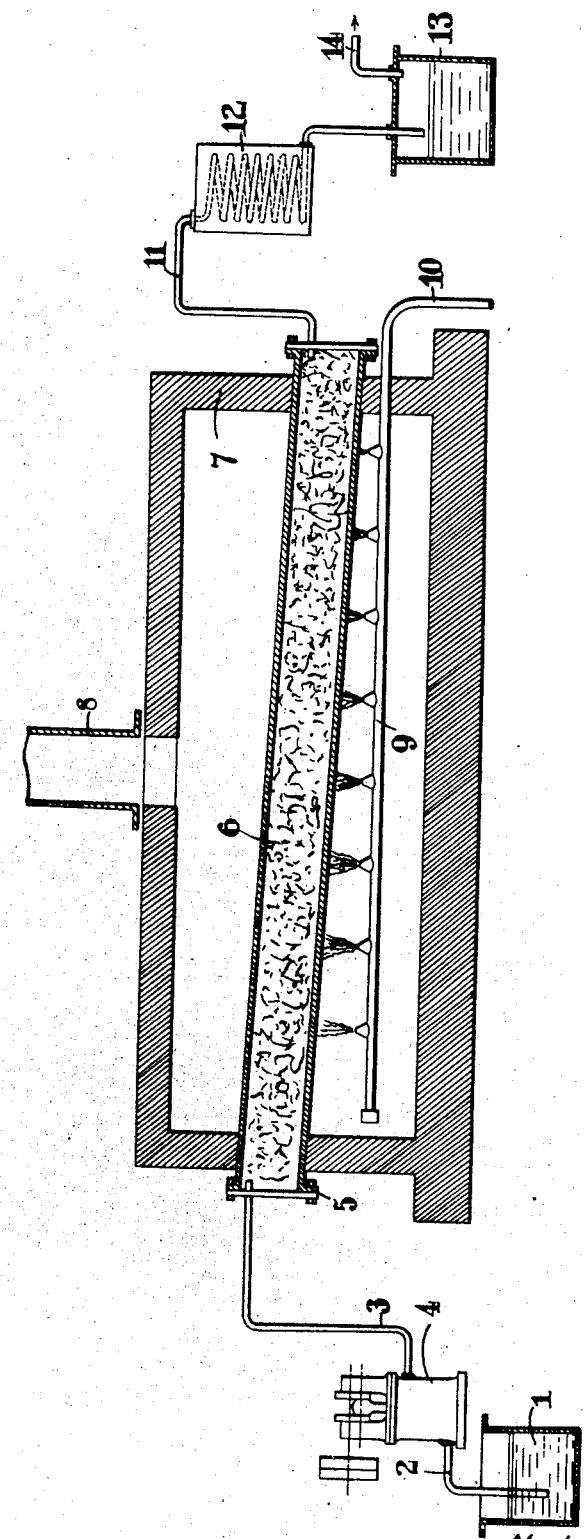

NOEL CHARLES CASSAL AND CHARLES EDWARD CASSAL, OF KENSINGTON, LONDON, AND BENJAMIN HENRY GERRANS, OF STREATHAM HILL, LONDON, ENGLAND.

TREATMENT OF LIQUID HYDROCARBONS FOR THE TRANSFORMATION THEREOF.

1,330,844.   Specification of Letters Patent.   Patented Feb. 17, 1920.

Application filed September 12, 1917. Serial No. 190,992.

*To all whom it may concern:*

Be it known that we, NOEL CHARLES CASSAL, of 56 Oxford Gardens, Kensington, London, W. 10, England, CHARLES EDWARD CASSAL, of 56 Oxford Gardens, Kensington, London, W. 10, England, and BENJAMIN HENRY GERRANS, of 57 Cricklade avenue, Streatham Hill, London, S. W. 2, England, have invented certain new and useful Improvements in or Relating to the Treatment of Liquid Hydrocarbons for the Transformation Thereof, of which the following is a specification.

This invention relates to processes of the kind in which hydrocarbons are passed over a heated mass in order to produce therefrom hydrocarbons, for instance, aromatic hydrocarbons such as benzene, toluene and the like.

In known processes of this description it has been proposed in order to produce benzol, toluol, xylol, etc., to pass petroleum residuals after removal of the burning and lubricating oils, in the form of a spray or vapor, through heated retorts which may be filled with coke, charcoal, metal, stone or other suitable material, the object being to bring the vapors into contact with a large area of heated surface.

With the object of cracking hydrocarbons, that is to say, converting them into hydrocarbons of lower specific gravity and reduced boiling point, it has been proposed to vaporize the oil and to pass the vapors at a temperature of 400°—500° C. and at a pressure of 60–280 lb. per square inch, but in some cases at pressures above or below these limits, through a chamber containing fragments of solid material to cause them to be thoroughly broken up, such material, for instance, alumina, being a catalytic material or being impregnated with a catalyst, then through a reflux condenser in which water under pressure was used as a cooling agent and then to condense the vapors passing through the condenser.

The employment of graphite as catalyst in the cracking of oils by heating the oils with graphite in suspension therein under particular conditions as to temperature and pressure has also been proposed.

According to the present invention petroleum hydrocarbons in the absence of added water or air are passed in a finely divided state through a body of heated catalyst, namely, carbon in the graphitic form or alumina, or through both, and leading away the gaseous and vaporous products as a whole in order that the more valuable hydrocarbons thus produced may be recovered.

We have found that if ordinary commercial petroluem oil be treated in this way, among the products of reaction benzene hydrocarbons, as benzene and toluene, are formed and the invention thus affords a means of obtaining such compounds from a cheap naturally occurring product, as well as of producing bodies adaptable for use in internal combustion engines.

The temperature at which the reactions are carried out may be varied according to the catalyst or catalysts used and the nature of the substance or substances being treated or the products it is desired to obtain, for example, when treating liquid hydrocarbons of the kind known as ordinary commercial petroleum oil with graphite as the catalyst temperatures from 500° to 800° C. or thereabout may be employed; or the substance may be successively treated with the same or different catalysts, either alone or together with another compound or compounds, in order to obtain a particular product or to secure an increased yield.

The following particulars are given by way of example in order to indicate a suitable method of carrying the invention into effect:—

A liquid hydrocarbon such, for example, as ordinary commercial petroleum burning oil (and which for the sake of brevity we will hereinafter refer to as "the oil") previously heated, or not, is introduced as a stream into a suitable vessel such as a nearly horizontal tube, cylinder or retort of about 4 feet in length and 4 inches in diameter, such vessel being charged with natural or artificial graphite in fragments of the size of relatively large peas and being heated to a temperature of 700° C. The oil is vaporized when it comes into contact with the heated vessel and the catalyst contained therein and thus passes through the mass of catalyst as vapor. The supply of material is with advantage regulated so that about 500 ccs. per hour of condensate is obtained when employing a vessel of the proportions referred to.

In some cases a vertical cylinder or retort may with advantage be employed and such retort may be contained within an annular chamber heated from both sides.

In the accompanying drawings, a suitable apparatus for carrying the invention into effect is illustrated by way of example.

In the drawings, 1 represents the reservoir for the oil to be treated, 2 the suction pipe and 3 the delivery pipe of the pump 4 employed for conveying the oil from the reservoir and delivering it into the retort 5 within which is contained the graphite 6. The retort is arranged in a suitable firebrick setting 7 provided with a chimney 8 for carrying off the combustion gases from the burner 9 which is connected by means of the pipe 10 to a source of supply of a suitable gaseous fuel.

At the end of the retort 5 remote from that at which the material to be treated is introduced, a pipe 11 is arranged to make connection with the condenser 12 adapted to deliver the condensate into the vessel 13 which is provided with a pipe 14 adapted to lead any gases produced in the treatment of the oil to suitable devices for storing or utilizing the gas.

Having now described our invention, what we claim as new and desire to secure by Letters Patent is:—

1. The process of treating liquid petroleum hydrocarbons in order to produce therefrom unsaturated cyclic hydrocarbons, which comprises passing petroleum hydrocarbons, in the absence of added water or air, in a finely divided state through a body of heated carbon in the graphitic form, and leading away the vaporous products as a whole, in order to recover the unsaturated cyclic hydrocarbons thus produced.

2. The process of treating liquid petroleum hydrocarbons in order to produce therefrom unsaturated cyclic hydrocarbons, which comprises passing petroleum hydrocarbons, in the absence of added water or air, in a finely divided state through a body of carbon in the graphitic form heated to a temperature in the neighborhood of 700° C., and leading away the vaporous products as a whole, in order to recover the unsaturated cyclic hydrocarbons thus produced.

3. The process of treating liquid petroleum hydrocarbons in order to produce therefrom unsaturated cyclic hydrocarbons, which comprises passing petroleum hydrocarbons of the character of burning oil, in the absence of added water or air, in a finely divided state through a body of heated carbon in the graphitic form, and leading away the vaporous products as a whole, in order to recover the unsaturated cyclic hydrocarbons thus produced.

4. The process of treating liquid petroleum hydrocarbons in order to produce therefrom unsaturated cyclic hydrocarbons, which comprises passing petroleum hydrocarbons of the character of burning oil in the absence of added water or air, in a finely divided state through a body of carbon in the graphitic form heated to a temperature in the neighborhood of 700° C., and leading away the vaporous products as a whole, in order to recover the unsaturated cyclic hydrocarbons thus produced.

5. The process of treating liquid petroleum hydrocarbons in order to produce therefrom unsaturated cyclic hydrocarbons, which comprises passing petroleum hydrocarbons, in the absence of added water or air, in a finely divided state and under a pressure not substantially exceeding atmospheric pressure through a body of heated carbon in the graphitic form, and leading away the vaporous products as a whole, in order to recover the unsaturated cyclic hydrocarbons thus produced.

6. The process of treating liquid petroleum hydrocarbons in order to produce therefrom unsaturated cyclic hydrocarbons, which comprises passing petroleum hydrocarbons, in the absence of added water or air, in a finely divided state and under a pressure not substantially exceeding atmospheric pressure through a body of carbon in the graphitic form heated to a temperature in the neighborhood of 700° C., and leading away the vaporous products as a whole, in order to recover the unsaturated cyclic hydrocarbons thus produced.

7. The process of treating liquid petroleum hydrocarbons in order to produce therefrom unsaturated cyclic hydrocarbons, which comprises passing petroleum hydrocarbons of the character of burning oil, in the absence of added water or air, in a finely divided state and under a pressure not substantially exceeding atmospheric pressure through a body of heated carbon in the graphitic form, and leading away the vaporous products as a whole, in order to recover the unsaturated cyclic hydrocarbons thus produced.

8. The process of treating liquid petroleum hydrocarbons in order to produce therefrom unsaturated cyclic hydrocarbons, which comprises passing petroleum hydrocarbons of the character of burning oil, in the absence of added water or air, in a finely divided state and under a pressure not substantially exceeding atmospheric pressure through a body of carbon in the graphitic form heated to a temperature in the neighborhood of 700° C., and leading away the vaporous products as a whole, in order to recover the unsaturated cyclic hydrocarbons thus produced.

In testimony whereof we have signed our names to this specification.

NOEL CHARLES CASSAL.
CHARLES EDWARD CASSAL.
BENJAMIN HENRY GERRANS.